United States Patent
Swan

(10) Patent No.: US 10,277,018 B2
(45) Date of Patent: Apr. 30, 2019

(54) CABLE CLAMPING APPARATUS

(71) Applicant: CMP Products Limited, Cramlington (GB)

(72) Inventor: Martin Swan, Cramlington (GB)

(73) Assignee: CMP PRODUCTS LIMITED, Cramlington (GB)

( * ) Notice: Subject to any disclaimer, the term of this patent is extended or adjusted under 35 U.S.C. 154(b) by 0 days.

(21) Appl. No.: 15/317,378

(22) PCT Filed: Jun. 3, 2015

(86) PCT No.: PCT/EP2015/062449
§ 371 (c)(1),
(2) Date: Dec. 8, 2016

(87) PCT Pub. No.: WO2016/000901
PCT Pub. Date: Jan. 7, 2016

(65) Prior Publication Data
US 2017/0117692 A1    Apr. 27, 2017

(30) Foreign Application Priority Data

Jun. 30, 2014   (EP) .................................... 14174989
Jun. 3, 2015    (GB) .................................. 1509593.8

(51) Int. Cl.
*H02G 3/06*    (2006.01)
(52) U.S. Cl.
CPC ............. *H02G 3/0666* (2013.01); *H02G 3/06* (2013.01)

(58) Field of Classification Search
CPC .................................................... H02G 3/0666
See application file for complete search history.

(56) References Cited

U.S. PATENT DOCUMENTS

| 4,432,520 A | * | 2/1984 | Simon | H02G 3/0658 174/153 G |
| 5,350,204 A | | 9/1994 | Henniger | |
| 5,998,737 A | * | 12/1999 | Weiss | F16L 3/08 174/135 |
| 6,568,716 B1 | | 5/2003 | Fieber | |

(Continued)

FOREIGN PATENT DOCUMENTS

| CN | 101714704 A | 5/2010 |
| DE | 4215635 | 11/1993 |

(Continued)

OTHER PUBLICATIONS

"International Search Report and Written Opinion", International Application No. PCT/EP2015/062449, dated Sep. 23, 2015, 11 pages.

*Primary Examiner* — William H Mayo, III
*Assistant Examiner* — Hiram E Gonzalez
(74) *Attorney, Agent, or Firm* — Billion & Armitage; Benjamin C. Armitage

(57) ABSTRACT

Embodiments herein discuss a clamping apparatus for a cable gland. The clamping apparatus includes a first body member having a first aperture therethrough for receiving a cable, a plurality of clamping members pivotably mounted relative to the first body member, and a second body member for causing the clamping members to move relative to the first body member into clamping engagement with the cable.

20 Claims, 15 Drawing Sheets

(56) References Cited

U.S. PATENT DOCUMENTS

| | | | | |
|---|---|---|---|---|
| 8,105,096 B2 * | 1/2012 | Dixon | .................. | H01R 13/502 |
| | | | | 174/59 |
| 9,263,867 B2 * | 2/2016 | Strelow | ................ | H02G 3/0658 |
| 2013/0203291 A1 | 8/2013 | Sticker et al. | | |
| 2016/0294173 A1 * | 10/2016 | Mood | .................. | H02G 15/068 |

FOREIGN PATENT DOCUMENTS

| | | |
|---|---|---|
| GB | 2488999 | 9/2012 |
| WO | 9427079 | 11/1994 |
| WO | 0114780 | 3/2001 |

* cited by examiner

CABLE CLAMPING APPARATUS

The present invention relates to a clamping apparatus, and relates particularly, but not exclusively, to a cable clamping apparatus for incorporation in a cable gland.

Cable glands are used to mount cables to an enclosure and generally have a gland body having an external screw threaded part. The gland body is formed from two or more parts defining an aperture through which a cable passes, and one or more seals are located in the gland body for sealing against an external surface of the cable. Conductors forming part of an earthing layer of the cable are splayed outwards and clamped between a conical body and a sleeve of the cable gland to provide an earth connection between the cable gland and the cable. As screw threads on two of the gland body parts engage each other, axial movement of the two parts relative to each other compresses one or more of the seals axially, causing the seals to expand radially and be brought into sealing engagement with an external surface of the cable. One or more of the seals can also perform a clamping function to resist axial movement of the cable relative to the gland body, i.e. to provide pull-out resistance to the cable.

This arrangement suffers from the drawback that the resilient seals only provide a satisfactory clamping action over a relatively narrow range of cable diameters. In addition, the use of a cone and sleeve arrangement to clamp the conductive members of the earthing layer to form an earth connection between the cable gland and the cable increases the cost and complexity of the cable gland, and increases the time taken for and complexity of its assembly.

GB 2488999 discloses a known locking device having gripping portions which grip a cable as a result of rotation of first and second retaining members relative to each other. However, this arrangement suffers from the disadvantage that the gripping portions must be flexible, in order to be brought into engagement with a cable passing through the device. This limits the clamping force which can be applied by the apparatus without causing damage to the cable Preferred embodiments of the present invention seek to overcome one or more of the above disadvantages of the prior art.

According to an aspect of the present invention, there is provided a clamping apparatus comprising:
  a body having a first aperture therethrough for receiving at least part of a cable;
  a plurality of clamping members moveably mounted relative to said body; and
  actuator means for causing said clamping members to move relative to said body;
characterised in that said clamping members are pivotably mounted relative to said body, and said actuator means is adapted to cause said clamping members to pivot relative to said body such that at least a respective part of a plurality of said clamping members is brought into clamping engagement with at least part of a cable passing through said first aperture.

By providing a plurality of clamping members pivotably mounted relative to the body, and actuator means for causing the clamping members to move relative to the body such that at least part of a plurality of the clamping members is brought into clamping engagement with at least part of a cable passing through the first aperture, this provides the advantage of enabling the clamping members to be constructed from a relatively rigid material. This in turn provides the advantage that clamping action does not rely on the resilience of a material, which enables a reliable clamping action to be achieved over a wider range of cable diameters.

A plurality of said clamping members may each include at least one respective first cam surface for engaging at least one second cam surface on said body to cause movement of said clamping members relative to said body.

This provides the advantage of simple construction.

At least one said first cam surface may be provided on a respective protrusion or recess adapted to engage a respective recess or protrusion on said body.

This provides the advantage of enabling compact construction of the clamping apparatus by enabling the clamping members to avoid protruding into the aperture in the body when not in clamping engagement with a cable.

The body may comprise at least one first body member having said first aperture therethrough and the actuator means may comprise at least one second body member having a second aperture therethrough for receiving at least part of a cable and moveably mounted relative to at least one said first body member.

A plurality of said clamping members may be pivotably mounted relative to at least one said second body member.

This provides the advantage of simplifying construction of the clamping apparatus.

At least one said second body member may be rotatably mounted relative to at least one said first body member.

This provides the advantage of enabling easier operation of the clamping apparatus as part of a cable gland. For example, the clamping apparatus can be incorporated into a cable gland such that rotation of threaded parts of the cable gland relative to each other to assemble the cable gland actuates the clamping apparatus.

At least one said second body member may be of substantially identical construction to at least one said first body member.

This provides the advantage of reducing the complexity and cost of manufacture of the apparatus.

The apparatus may further comprise locking means for maintaining clamping engagement of a plurality of said clamping members with said cable.

The locking means may comprise first engaging means on at least one said first body member and second engaging means on at least one said second body member, wherein said first and second engaging means are adapted to be brought into frictional engagement with each other as a result of actuation of said actuator means.

This provides the advantage of maintaining clamping engagement of a plurality of said clamping members with said cable over a wider range of cable diameters, thereby improving fitting of the apparatus to the cable.

At least one said first body member may be adapted to move axially relative to at least one said second body member to bring said first and second engaging means into frictional engagement with each other.

This provides the advantage of maintaining clamping engagement of a plurality of said clamping members with said cable over a wider range of cable diameters.

A plurality of said clamping members may be of substantially identical construction to each other.

This provides the advantage of further reducing complexity and cost of the apparatus.

At least one said clamping member may include a curved surface adapted to be brought into clamping engagement with the cable.

This provides the advantage of improving the clamping force and/or axial pull load resistance.

At least one said curved surface may have a plurality of surface portions having different curvatures and adapted to engage respective surfaces of cables of different diameters.

This provides the advantage of enabling the clamping apparatus to effectively grip cables of a wide variety of diameters while minimising the risk of damage to the cables.

At least one said clamping member may comprise at least one protrusion on a surface thereof adapted to be brought into clamping engagement with the cable.

This provides the advantage of improving the clamping force and/or axial pull load resistance.

At least one said protrusion may be adapted to penetrate at least one layer of the cable.

This provides the advantage of improving reliability of earthing electrical connection between conductive members of the cable and a cable gland incorporating the apparatus.

The apparatus may be adapted to make electrical contact with at least one electrically conductive member of the cable.

This provides the advantage that a cone and sleeve arrangement for clamping the conductive members is no longer necessary, thereby reducing the cost and complexity of a cable gland incorporating the clamping apparatus and reducing the time taken for and complexity of assembly of the cable gland.

According to another aspect of the present invention, there is provided a cable gland comprising:
- a gland body having a third aperture therethrough for receiving at least part of a cable;
- at least one seal for sealing engagement with at least part of a cable extending through said third aperture; and
- at least one clamping apparatus as defined above.

The cable gland may further comprise at least one first gland body member and at least one second gland body member, wherein at least one said clamping apparatus is actuated by rotation of at least one said first gland body member relative to at least one said second gland body member.

This provides the advantage of simplifying operation of the cable gland.

Preferred embodiments of the invention will now be described, by way of example only and not in any limitative sense, with reference to the accompanying drawings, in which.

Figure 1:
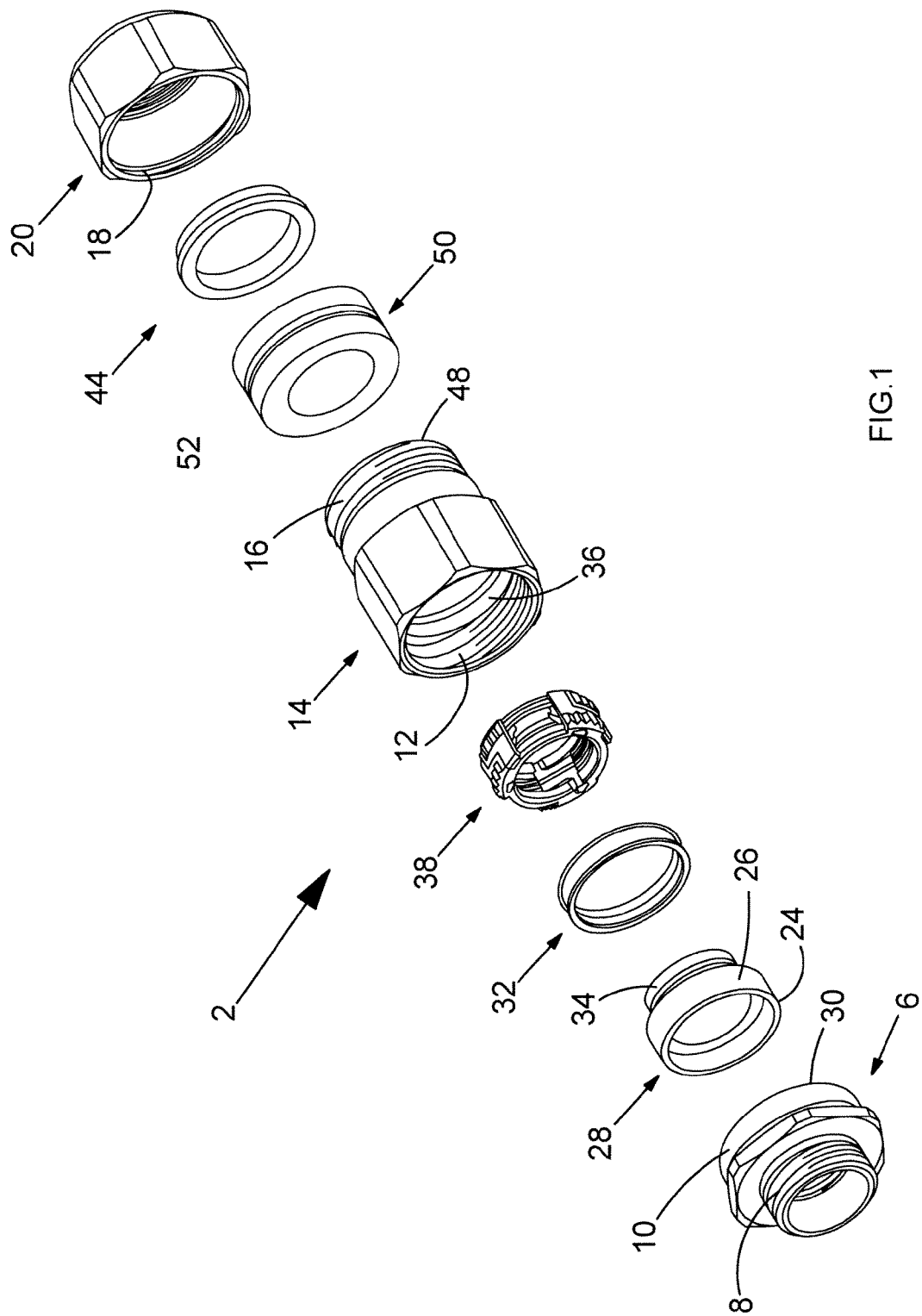
FIG. 1 is an exploded perspective view of a first embodiment of a cable gland of the present invention.
Figure 2:
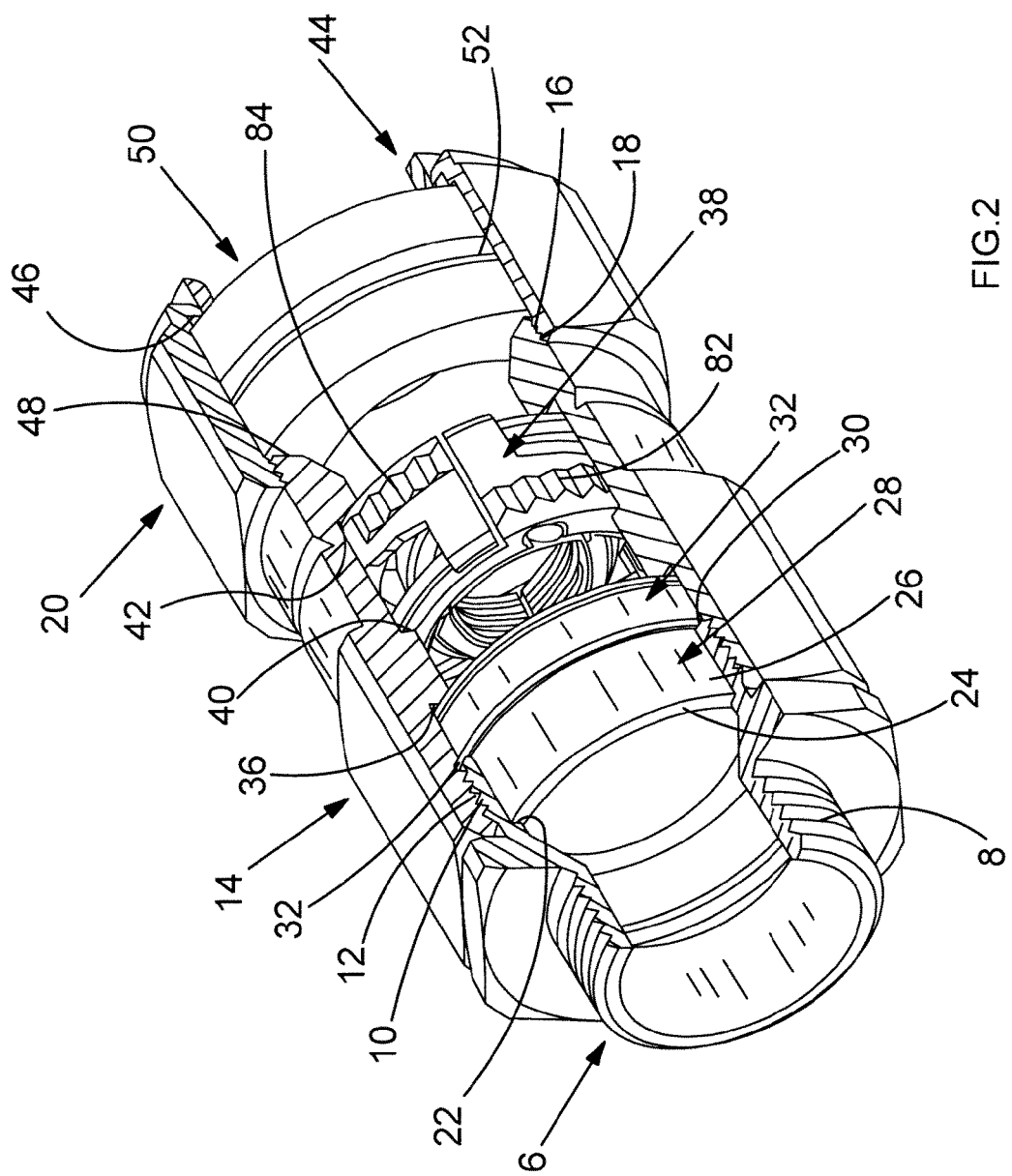
FIG. 2 is a partially cut-away perspective view of the cable gland of FIG. 1 in an assembled condition.

Referring to FIGS. 1 and 2, a cable gland 2 of a first embodiment of the present invention for mounting a cable 4 (FIGS. 6 to 9) to an enclosure (not shown) has a first gland body member 6 having a first external screw threaded portion 8 for engagement with a corresponding thread on the enclosure and a second external screw threaded portion 10 for engaging a first internal screw threaded portion 12 of a second gland body member 14. The second gland body member 14 has a third external screw threaded portion 16 for engagement with a second internal screw threaded portion 18 on a third gland body member 20. The first 6, second 14 and third 20 gland body members are mounted together to form a body of the cable gland 2.

The first gland body member 6 has a first radial surface 22 for abutment with a first end 24 of a wider part 26 of a generally conical member 28 forming part of a cone and sleeve assembly. A second radial surface 30 of the first gland body member 6 abuts a first end of a sleeve 32 forming part of the cone and sleeve assembly and inside which a narrower part 34 (FIG. 2) of the conical member 28 fits. A second end of the sleeve 32 abuts a third radial surface 36 on the second gland body member 14, such that engagement of the first 6 and second 14 gland body members to move the first 22 and second 36 radial surfaces towards each other holds the conical member 28 and sleeve 32 in position to clamp electrically conductive members 74 (FIGS. 7 to 9) of an earthing layer of the cable 4 between the conical member 28 and the sleeve 32 to form an electrical connection between the cable gland 2 and the cable 4.

A clamping apparatus 38 of a first embodiment of the present invention (the operation of which will be described in greater detail below with reference to FIGS. 3 to 6) is located between a fourth radial surface 40 and a fifth radial surface 42 on the second gland body member 14. The third gland body member 20 contains a ferrule 44 which abuts a sixth radial surface 46 on the third gland body member 20 and a seventh radial surface 48 on the second gland body member 14 abuts an end surface of a resilient seal 50 having an external circumferential groove (52) such that threaded engagement of the second 14 and third 20 gland body members to cause the sixth 46 and seventh 48 radial surfaces to move towards each other compresses the seal 50. The circumferential groove 52 causes the seal 50 to flex radially inwards into sealing engagement with a sheath 54 (FIGS. 6 to 9) of the cable 4.

Referring to FIGS. 3 to 6, the clamping apparatus 38 and has a plurality of (in the embodiment shown, three) clamping members 56 (FIG. 4) arranged to define an aperture 58 for receiving the cable 4. Each of the clamping members 56 has a first protrusion 60 at a first end 62 thereof for engaging a body of the clamping apparatus 38 in the form of a first body member 64 (FIG. 5) such that rotation of the clamping members 56 relative to the first body member 64 causes the first protrusions 60 to engage respective cam surfaces (not shown) on the first body member 64 to cause the clamping members 56 to pivot relative to actuator means in the form of a second body member 66 such that the first ends 62 of the clamping members 56 pivot inwards to reduce the size of the aperture 58. The first 64 and second 66 body members define respective first and second apertures therethrough for receiving the cable 4.

Each of the clamping members 56 has a second protrusion 68 at a second end thereof for pivotably engaging respective recesses 70 in second body member 66. In this way, inward or outward pivoting of the clamping members 56 is achieved by rotation of the first body member 64 relative to the second body member 66. Each of the clamping members 56 has a curved clamping surface 72 for engaging conducting sheath 74 (FIG. 7) of the cable 4 to prevent longitudinal movement of the cable 4 relative to the second gland body member 14, while providing an adequate clamping force over a wide range of cable diameters. Each clamping surface 72 has a first surface portion 73 adapted to engage an external surface of a cable of a first diameter and a pair of second surface portions 75 adapted to engage an external surface of a cable of a second diameter, larger than the first diameter. This enables the clamping apparatus 30 to effectively grip cables of a wide variety of diameters while minimising the risk of damage to the cables. The curved clamping surfaces 72 are also provided with protrusions in the form of ribs 76 to improve the clamping force and pull load resistance. First teeth 82 provided on first body member 64 engage corresponding recesses (not shown) on the internal surface of the second gland body member 14, and second teeth 84 provided on the second body member 66 engage corresponding recesses (not shown) on the internal surface of the third gland body member 20. In this way, rotation of the second 14 and third 20 gland body members relative to each other causes rotation of the first 64 and second 66 body members relative to each other to actuate the clamping apparatus 38 to move the clamping members 56 from an unclamped position to a clamped position.

The operation of the cable gland 2 will now be described.

Figure 3:
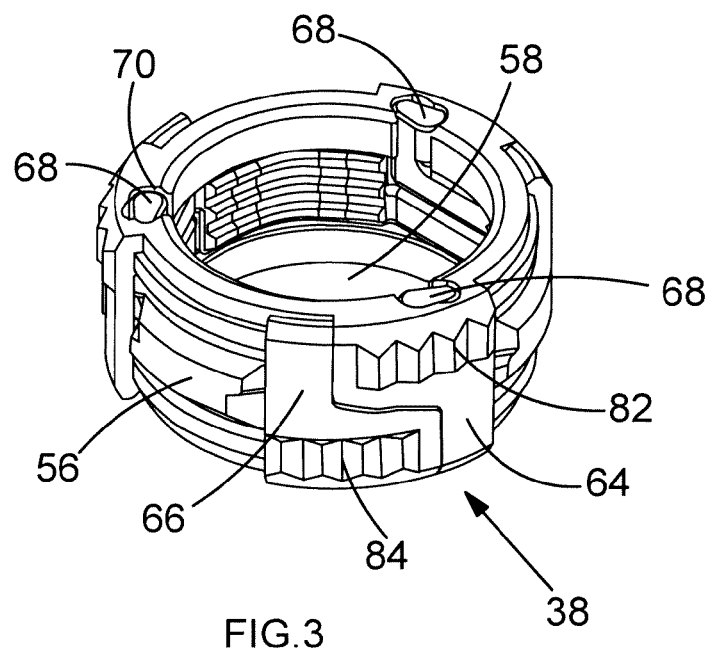
FIG. 3 is a schematic perspective view of first embodiment of a clamping apparatus of the cable gland of FIG. 1 embodying the present invention and with clamping members thereof in an unclamped position.
Figure 7:
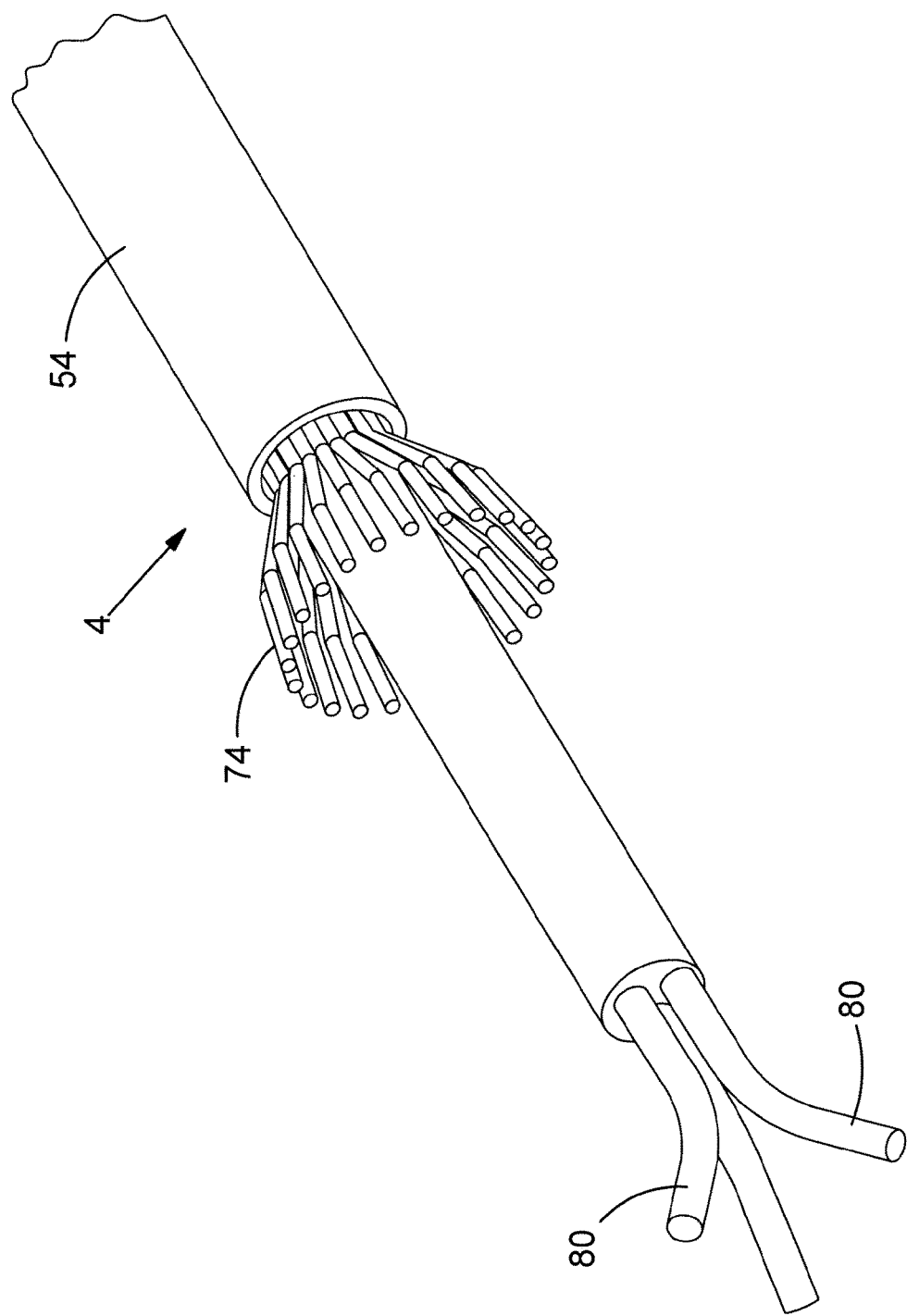
FIG. 7 is a perspective view of a cable prior to mounting the cable gland of FIG. 1 thereto.
Figure 8:
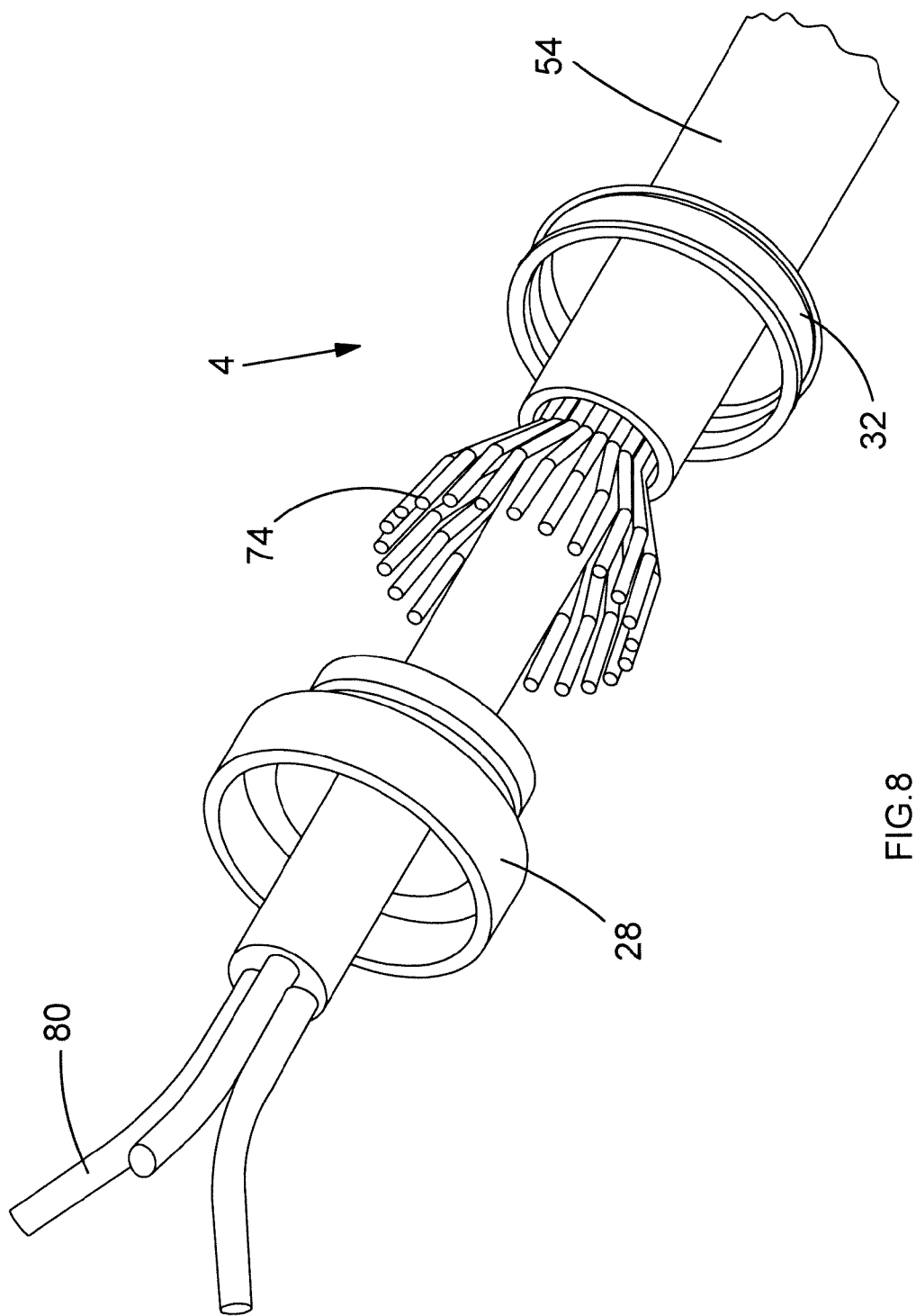
FIG. 8 is a perspective view of the cable of FIG. 7 with a cone and sleeve assembly of the cable gland of FIG. 1 in an unassembled condition.
Figure 9:
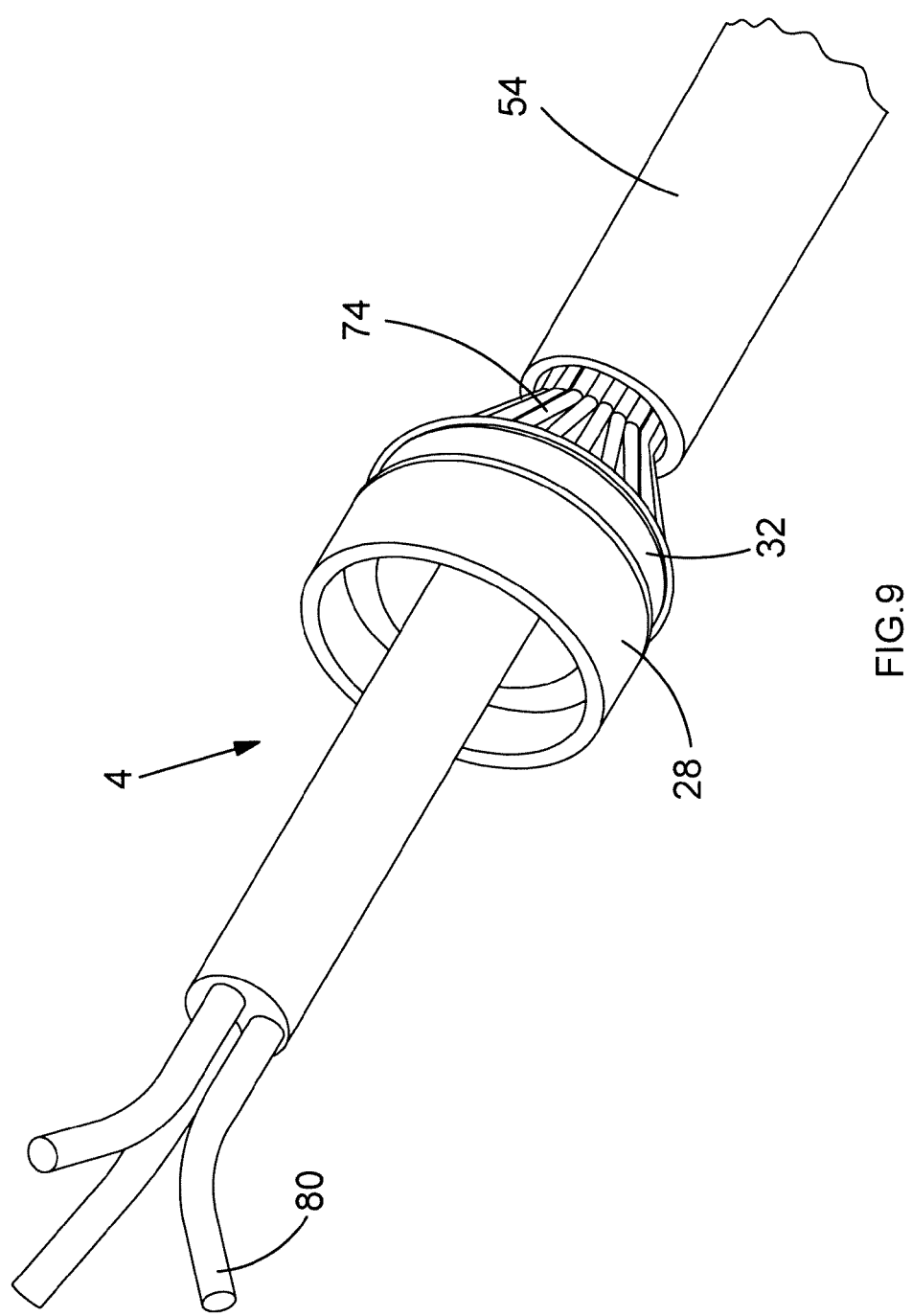
FIG. 9 is a view corresponding to FIG. 8 with the cone and sleeve assembly in an assembled condition.

The cable 4 is initially prepared as shown in FIGS. 7 to 9 by removal of part of the sheath 54 to expose the conductive members 74 and individual conductors 80, and the conductive members 74 are splayed outwards as shown in FIG. 7. The splayed conductive members 74 are then located between the conical member 28 and sleeve 32 as shown in FIG. 8, and the conical member 28 and sleeve 32 are brought into engagement with each other as shown in FIG. 9 to establish an electrical connection between the conductive members 74 and the conical member 28 and/or sleeve 32. The first 6 gland body member is then brought into threaded engagement with the second gland body member 14. At this time, the second 14 and third 20 gland body members are in loosely threaded engagement with each other so that the seal 50 is uncompressed or is only lightly compressed, and the clamping apparatus 38 is in its unclamped position as shown in FIG. 3.

Figure 5:
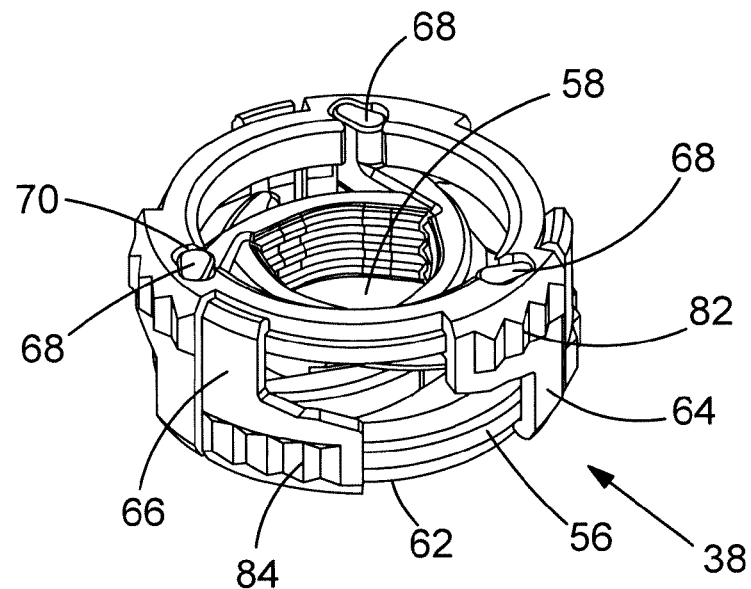
FIG. 5 shows the clamping apparatus of FIG. 3 with the clamping members in a clamped position.
Figure 6:
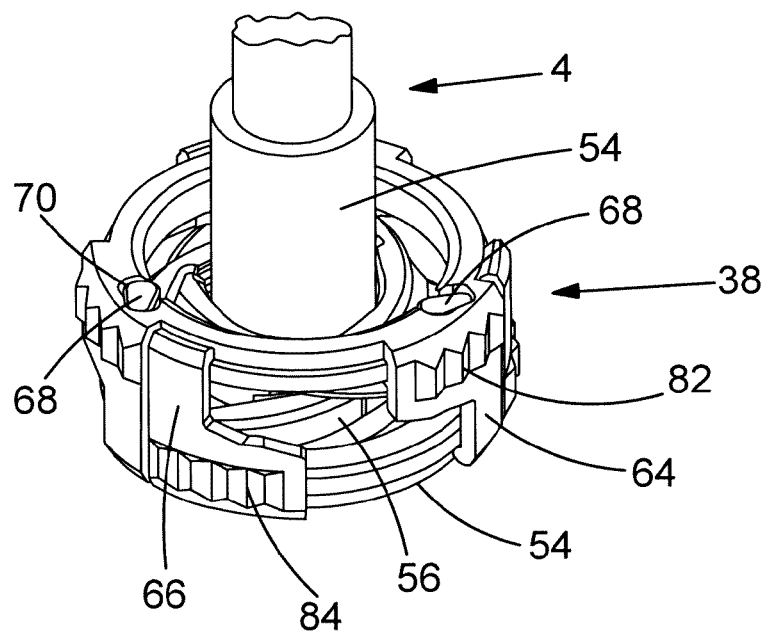
FIG. 6 is a view corresponding to FIG. 5 with the clamping apparatus mounted to a cable.

The second 14 and third 20 gland body members are then brought into tighter threaded engagement with each other to cause the first 64 and second 66 body members of the clamping apparatus 38 to be rotated relative to each other to bring the curved clamping surfaces 72 of the clamping members 56 into engagement with the external surface of the sheath 54 of the cable 4, as shown in FIGS. 5 and 6 to firmly clamp the cable 4 in position. Tighter engagement of the second 14 and third 20 gland body members also causes the seal 50 to be compressed and urged radially inwards into sealing engagement with the sheath 54 of the cable 4.

Figure 4:
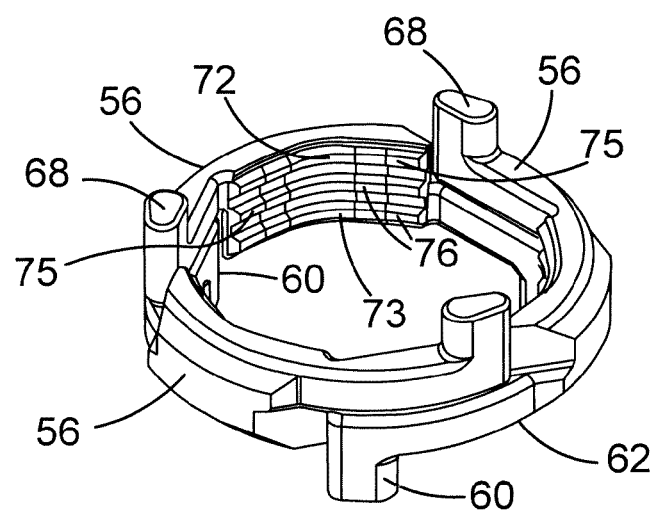
FIG. 4 shows a perspective view of the clamping members of the clamping apparatus of FIG. 3.
Figure 10:
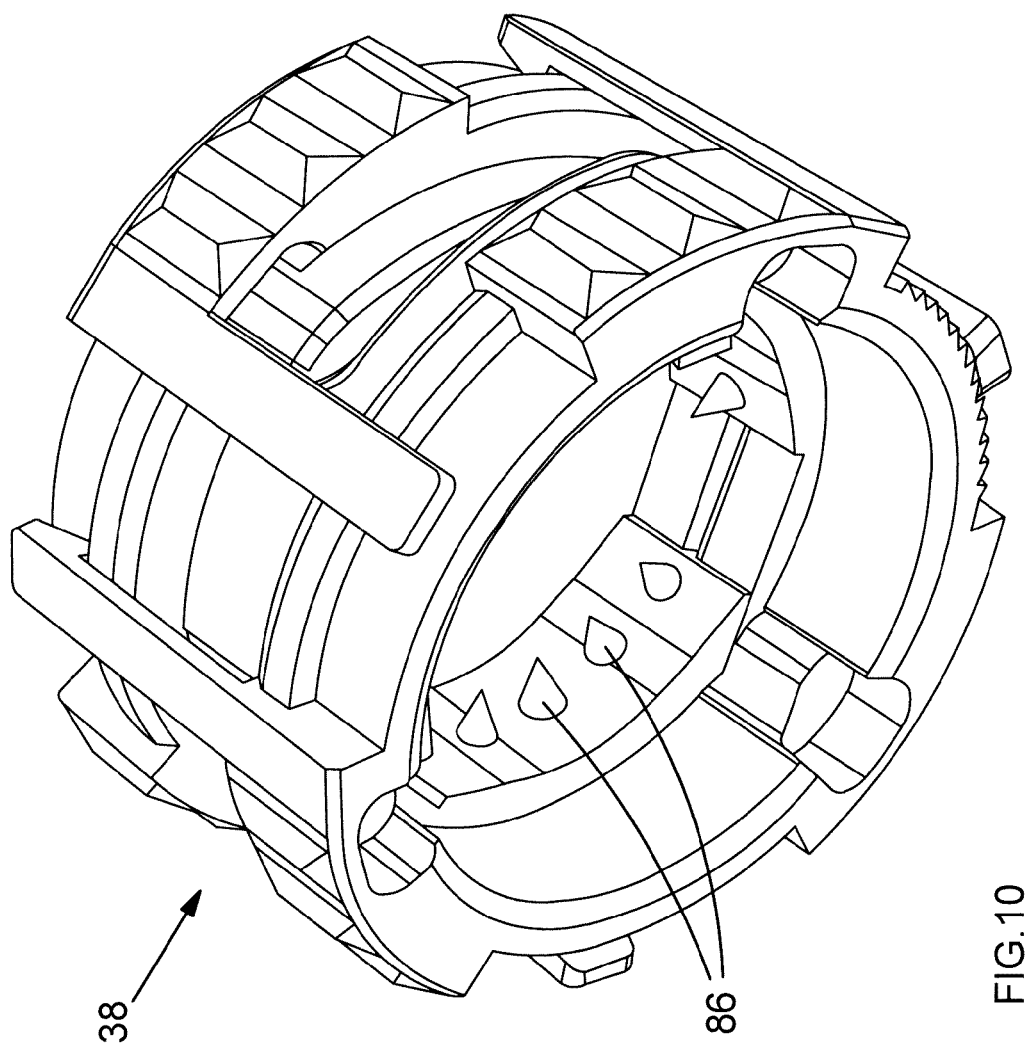
FIG. 10 is a perspective view of a second embodiment of a clamping apparatus of the present invention.
Figure 11:
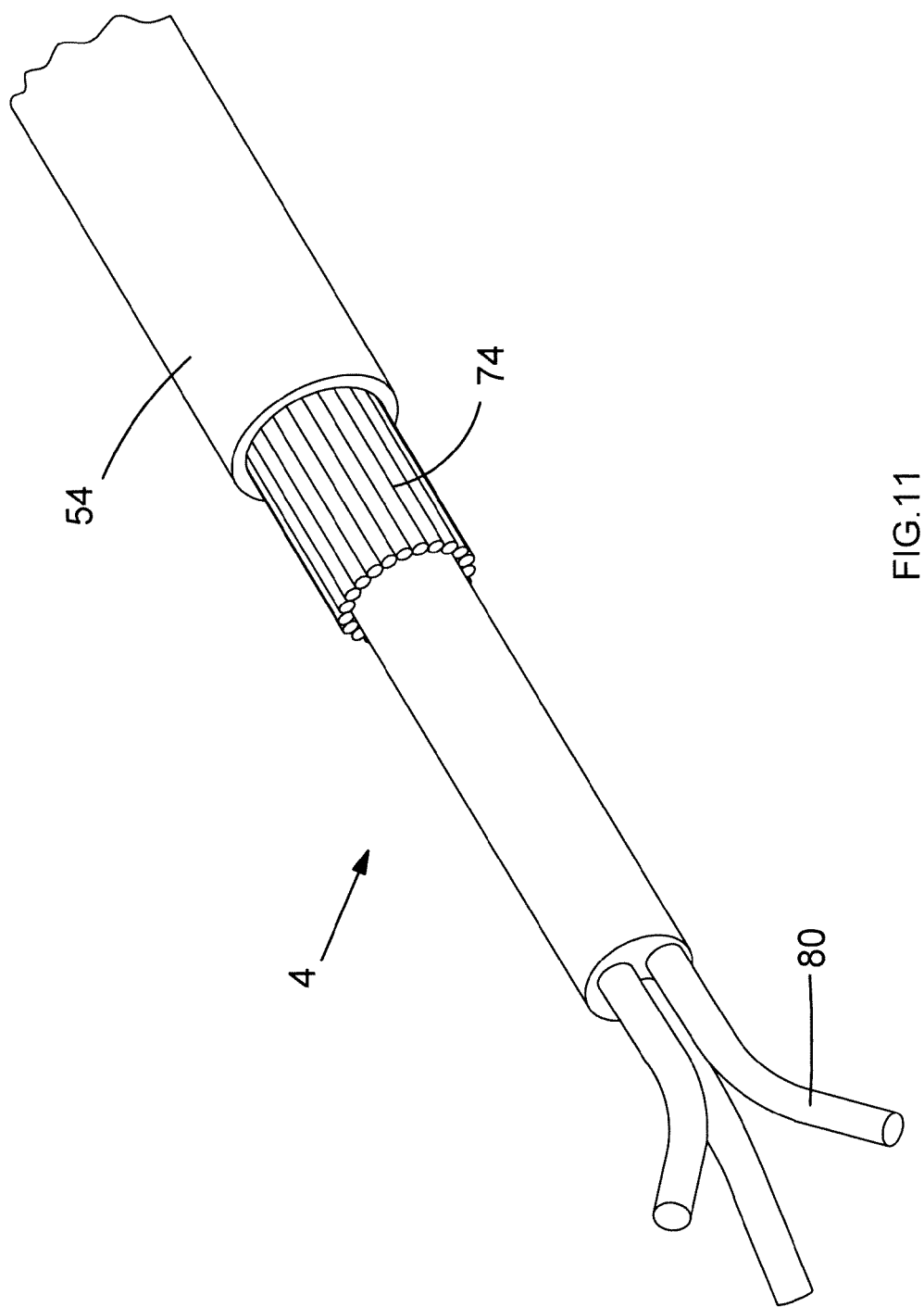
FIG. 11 is a perspective view of a cable prior to mounting of the clamping apparatus of FIGS. 4 to 6 thereto.
Figure 12:
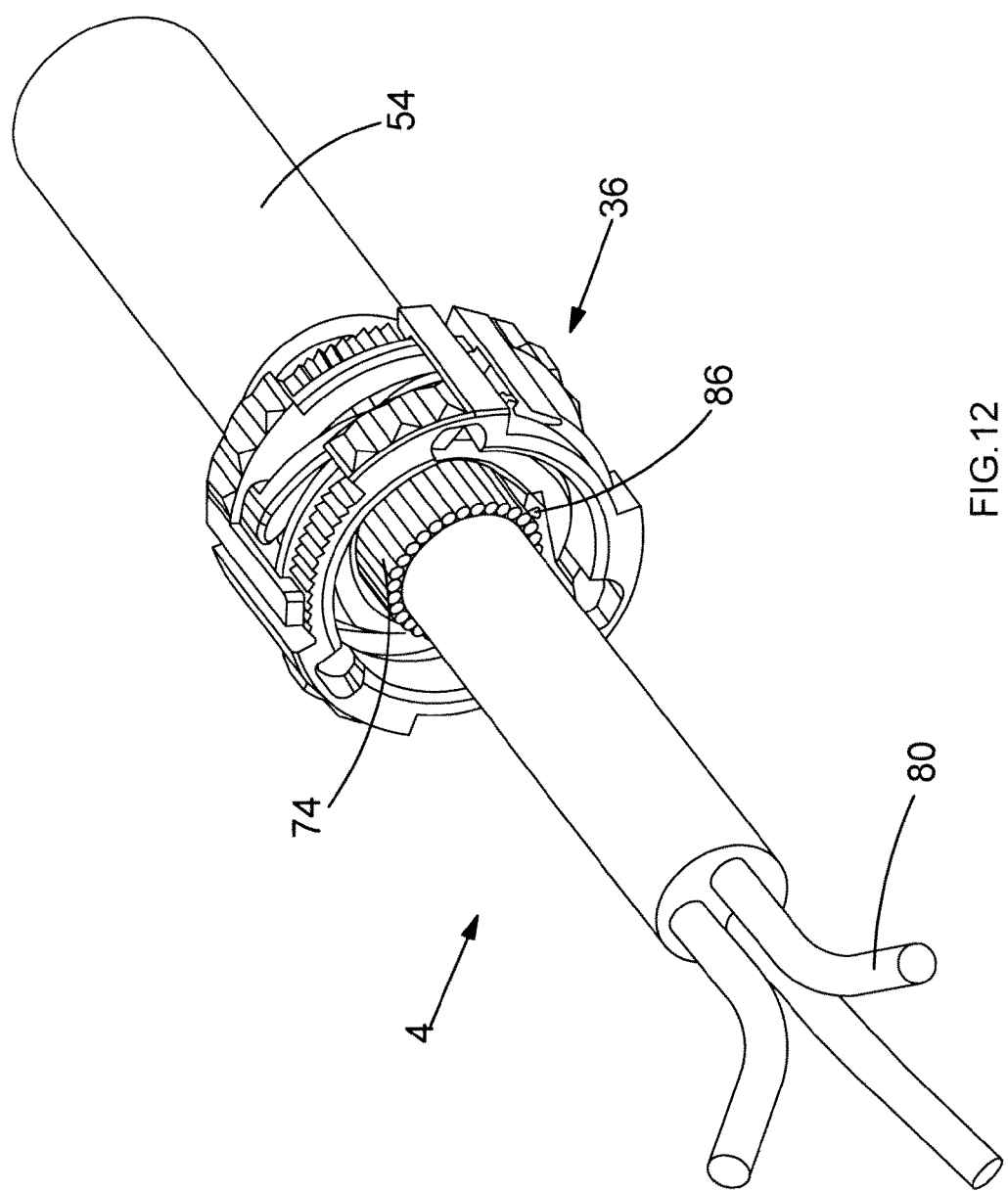
FIG. 12 is a perspective view of the clamping apparatus of FIGS. 4 to 6 mounted to the cable of FIG. 11.
Figure 13:
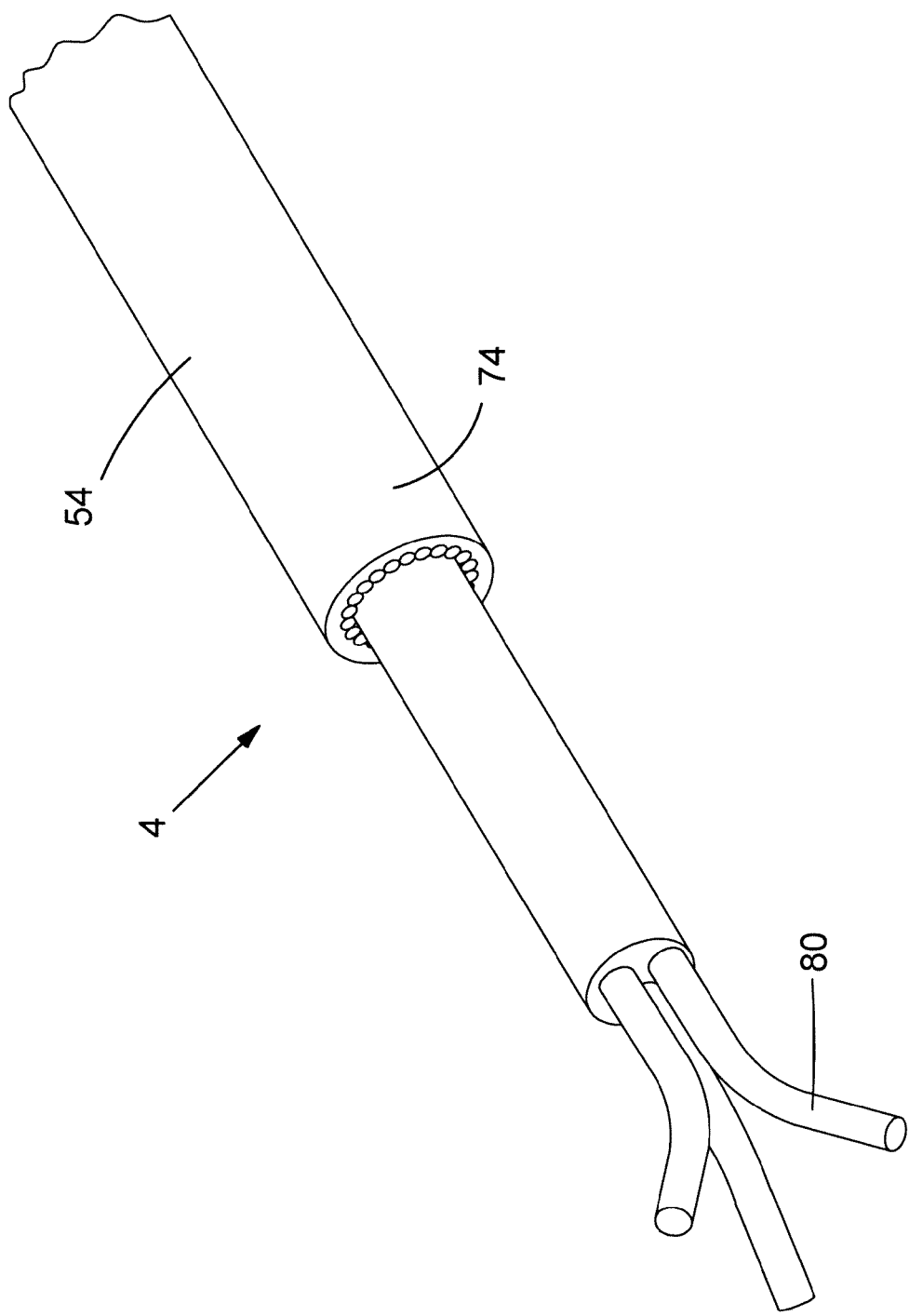
FIG. 13 is a perspective view of a cable prior to mounting of the clamping apparatus of FIG. 10 thereto.
Figure 15:
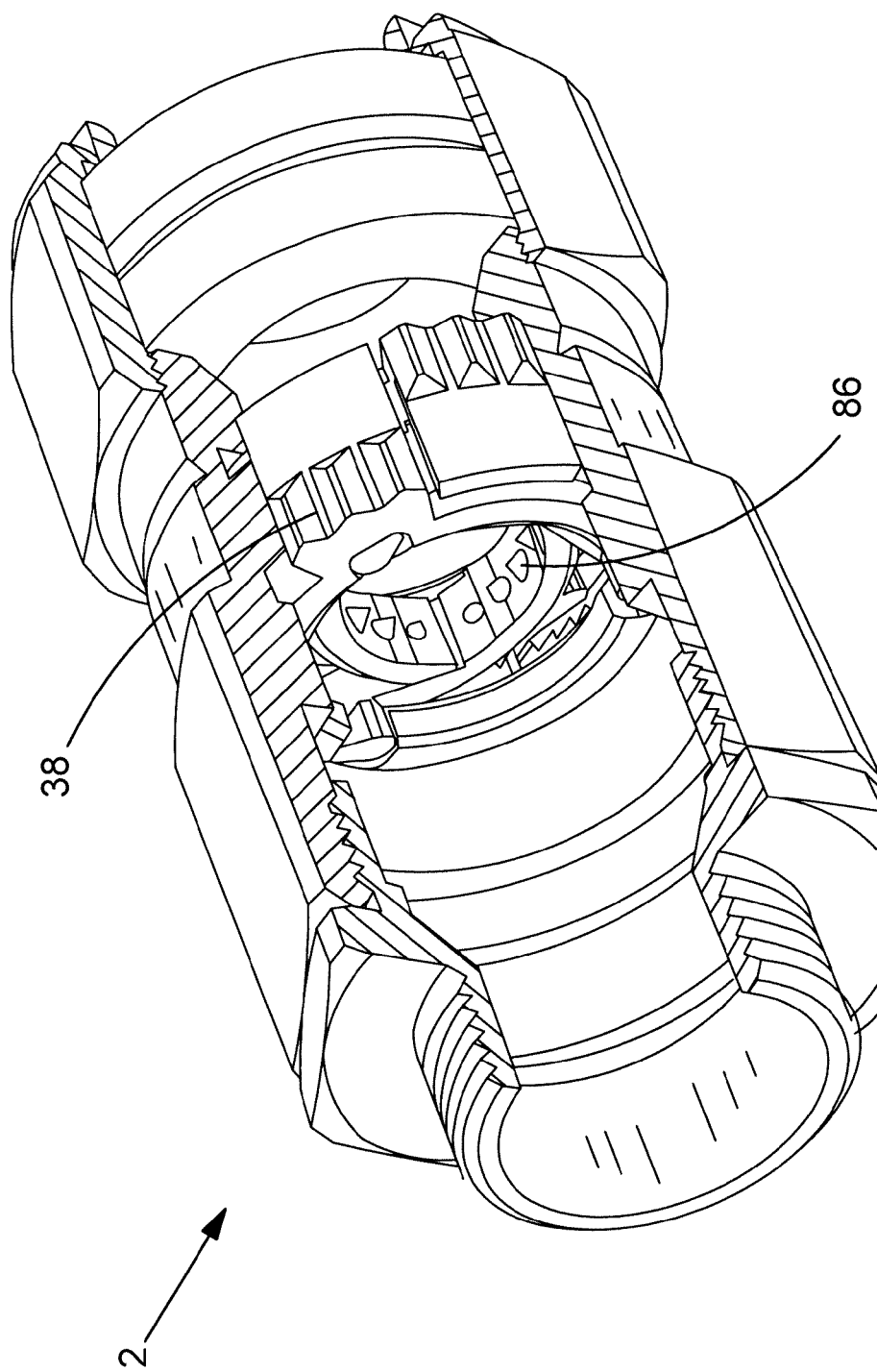
FIG. 15 is a partially cut-away perspective view of a cable gland incorporating the clamping apparatus of FIG. 10.

A clamping apparatus 38 of a second embodiment of the present invention is shown in FIG. 10. In the clamping apparatus 38 of FIG. 10, the ribs 76 of the embodiment of FIGS. 3 to 6 are replaced by electrically conductive spikes 86 which penetrate the sheath 54 of the cable 4 as the clamping apparatus 38 is brought into its clamping condition, so that an electrical connection is formed between the electrically conductive members 74 of the earthing layer of the cable 4 and the electrically conductive spikes 86, without the necessity of removing the sheath 54 of the cable 4 to expose the electrically conductive members 74, as is shown in FIG. 13. Alternatively, or in addition, the clamping apparatus 38 can be provided with ribs 76 as shown in FIG. 4 for forming an electrical connection with conductive members 74, as shown in FIGS. 11 and 12. In this way, the clamping apparatus 38 provides an earthing connection between the cable gland 2 and the cable 4 and pullout resistance at the same time, as a result of which the conical member 28 and sleeve 32 of the embodiment of FIGS. 1 to 9 are no longer necessary. This simplifies the construction of the cable gland 2 embodying the arrangement of FIG. 10, but also simplifies the assembly of the cable gland 2 to the cable 4, since the conductive members 74 do not need to be splayed outwards, and the cable gland 2 can be directly mounted to the cable 4 as shown in the arrangement of FIG. 12. A cable gland 2 incorporating the clamping apparatus 38 of FIG. 10 is shown in FIG. 15.

Figure 14:
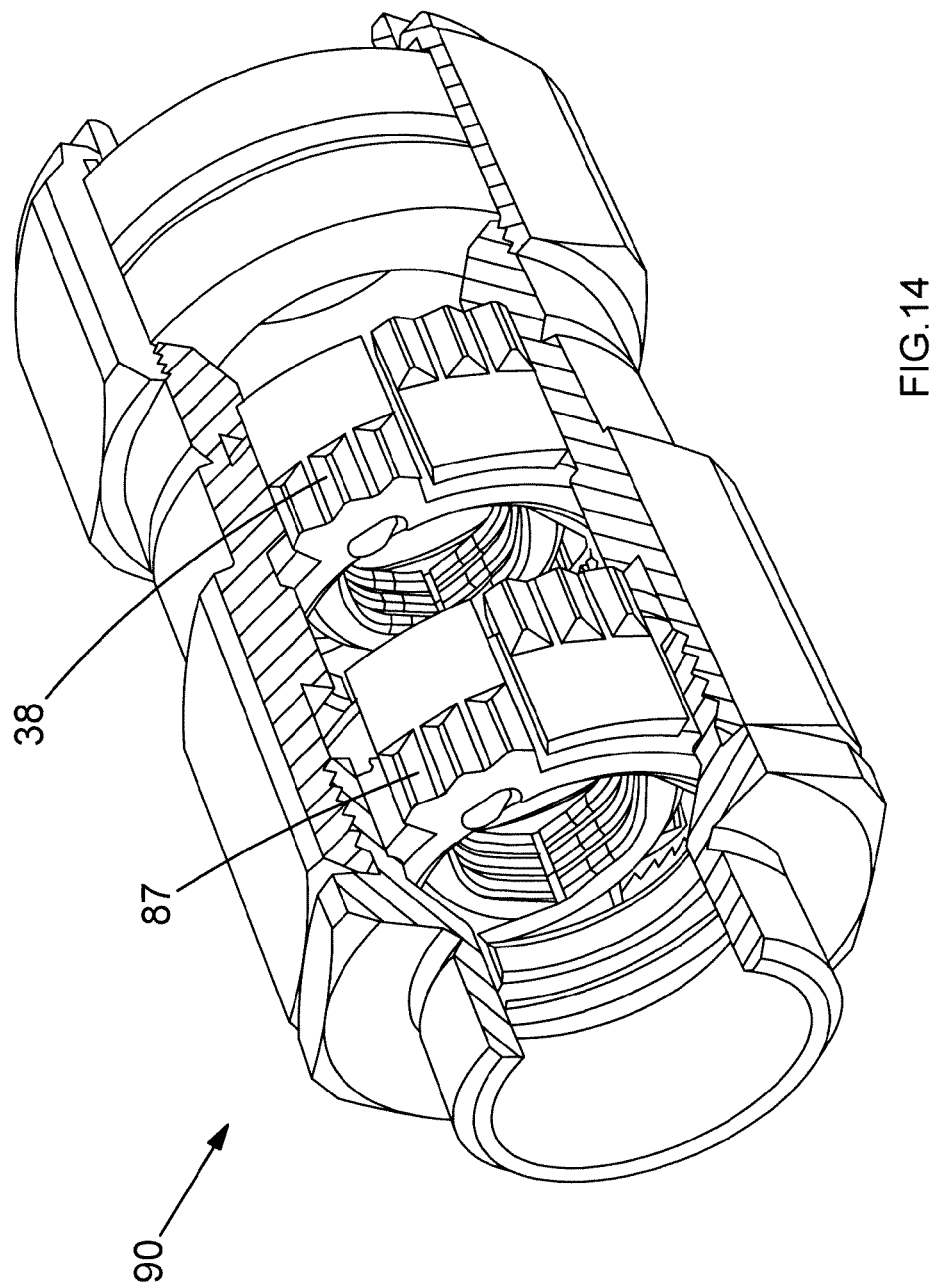
FIG. 14 is a partially cut-away perspective view of a second embodiment of a cable gland of the present invention.

A second embodiment of a cable gland 90 of the present invention is shown in FIG. 14. The cable gland 90 includes a first clamping apparatus 38 as shown in FIGS. 4 to 6 for clamping the external surface of a cable 4 and a second clamping apparatus 87 as shown in FIGS. 4 to 6 or FIG. 10 for establishing an electrical connection with the conductive members 74 of the cable 4. In this case, the conical member 28 and sleeve 32 of the embodiment of FIG. 1 are no longer necessary.

Figure 16:
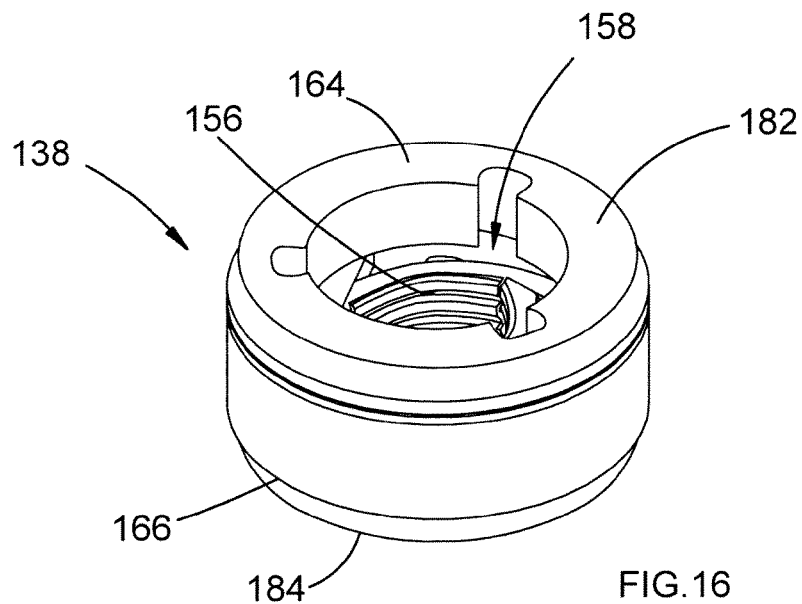
FIG. 16 is a perspective view of a third embodiment of a clamping apparatus of the present invention.
Figures 17, 17A:
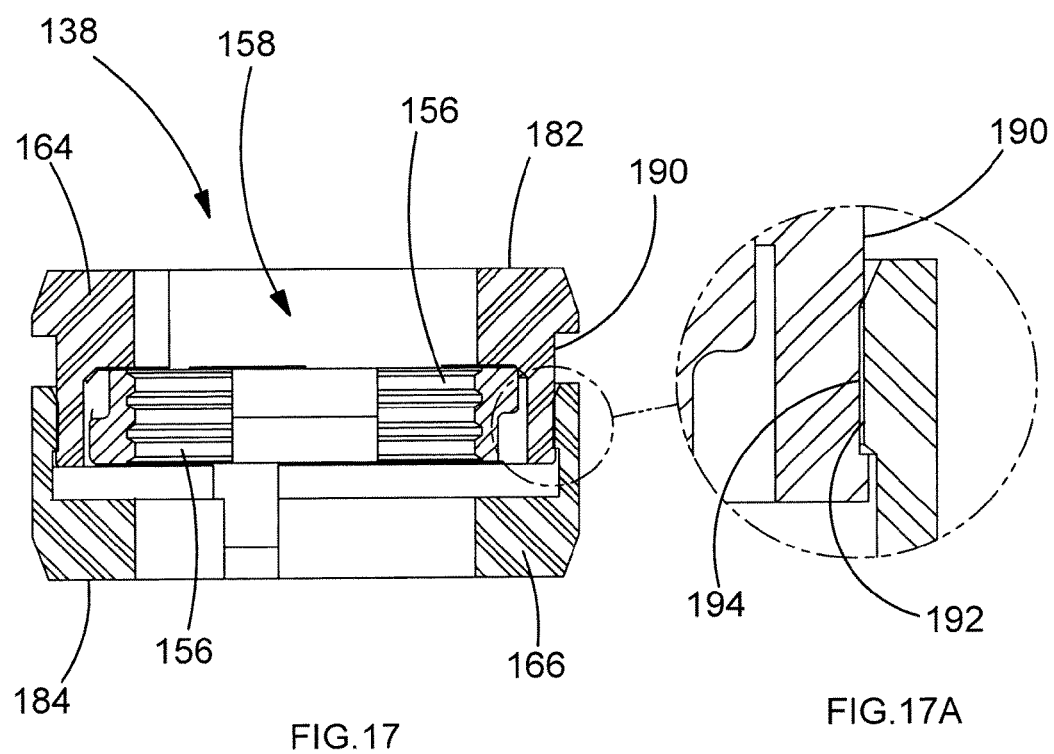
FIG. 17 is a cross sectional view of the apparatus of FIG. 16 in an unclamped position.
FIG. 17A is an enlarged view of part of the apparatus of FIG. 17.
Figures 18, 18A:
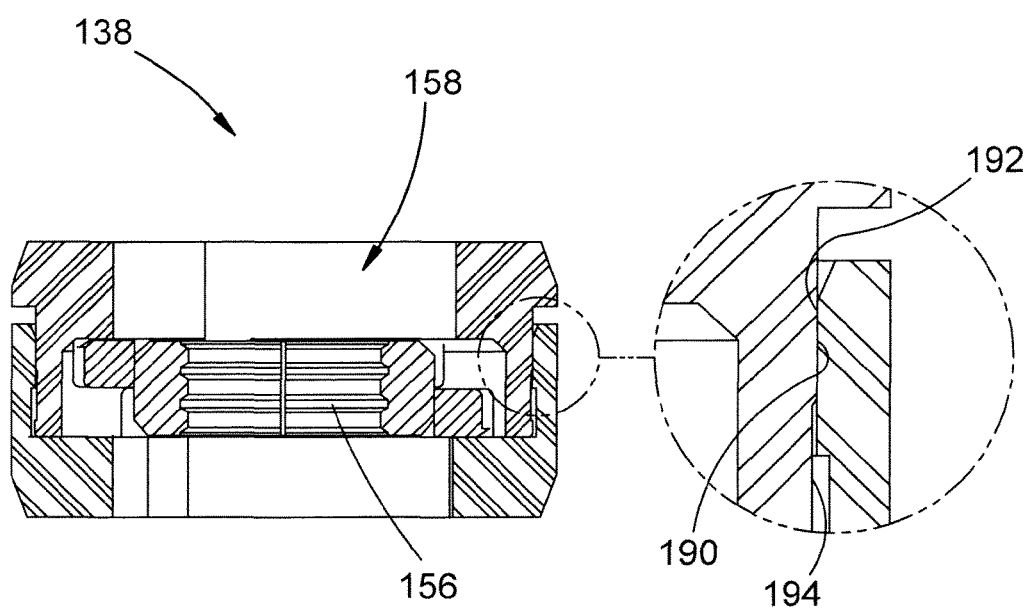
FIG. 18 is a cross sectional view of the apparatus of FIG. 16 in a clamped position.
FIG. 18A is an enlarged view of part of the apparatus of FIG. 18.

A clamping apparatus 138 of a third embodiment of the present invention is shown in FIGS. 16 to 18, in which parts common to the embodiment of FIGS. 3 to 6 are denoted by like reference numerals but increased by 100. The clamping apparatus 138 has first 164 and second 166 body members having respective end faces 182, 184 having teeth (not shown) for engaging the second 14 and third 20 gland body members respectively (FIGS. 1 and 2) to enable the first 164 and second 166 body members to rotate relative to each other to enable pivoting of clamping members 156 relative to the first 164 and second 166 body members in a manner similar to the embodiment of FIGS. 3 to 6, between an unclamped position (FIG. 17) in which a cable (not shown) can be inserted into an aperture 158 defined by the clamping members 156, and a clamped position (FIG. 18) in which the clamping members 156 engage a cable inserted into the aperture 158.

The first 164 and second 166 body members are axially moveable relative to each other and threaded engagement of the second 14 and third 20 gland body members urges the first 164 and second 166 body members axially towards each other, from the position shown in FIG. 17 to that shown in FIG. 18. The clamping apparatus 138 includes locking means including first engaging means in the form of a first friction surface 190 on the first body member 164 and second engaging means in the form of a second friction surface 192 on the second body member 166. The first friction surface 190 is axially spaced from a narrower portion 194 provided on the first body member 164 and having a smaller diameter than the first friction surface 190. The first body member 164 is moveable axially relative to the second body member 166 between the position shown in FIG. 17A, in which the second friction surface 192 is arranged adjacent the narrower portion 194 and does not engage the first friction surface 190, allowing the first body member 164 to rotate freely relative to the second body member 166, and the position shown in FIG. 18A, in which the second friction surface 192 frictionally engages the first friction surface to prevent rotation of the first body member 164 relative to the second body member 166. This in turn prevents disengagement of the clamping members 156 from the cable.

It will be appreciated by persons skilled in the art that the above embodiment has been described by way of example only and not in any limitative sense, and that various alterations and modifications are possible without departure from the scope of the invention as defined by the appended claims.

The invention claimed is:

1. A clamping apparatus comprising:
a body having a first aperture therethrough for receiving at least part of a cable;
a plurality of clamping members moveably mounted relative to said body; and
at least one actuator device for causing said clamping members to move relative to said body;
wherein said clamping members are pivotably mounted relative to said body via one or more protrusions pivotably engaging respective recesses in the body, at least one said actuator device is adapted to cause said clamping members to pivot relative to said body, such that at least a respective part of a plurality of said clamping members is brought into clamping engagement with at least part of a cable passing through said first aperture, and at least one said clamping member includes a curved surface adapted to be brought into clamping engagement with the cable.

2. An apparatus according to claim 1, wherein a plurality of said clamping members each include at least one respective first cam surface for engaging at least one second cam surface on said body to cause movement of said clamping members relative to said body.

3. An apparatus according to claim 2, wherein at least one said first cam surface is provided on a respective protrusion or recess adapted to engage a respective recess or protrusion on said body.

4. An apparatus according to claim 1, wherein the body comprises at least one first body member having said first aperture therethrough and at least one said actuator device comprises at least one second body member having a second aperture therethrough for receiving at least part of a cable and moveably mounted relative to at least one said first body member.

5. An apparatus according to claim 4, wherein a plurality of said clamping members are pivotably mounted relative to at least one said second body member.

6. An apparatus according to claim 4, wherein at least one said second body member is rotatably mounted relative to at least one said first body member.

7. An apparatus according to claim 4, wherein said locking means comprises first engaging device on at least one said first body member and at least one second engaging device on at least one said second body member, wherein at least one said first engaging device and at least one said second engaging device are adapted to be brought into frictional engagement with each other as a result of actuation of at least one said actuator device.

8. An apparatus according to claim 7, wherein at least one said first body member is adapted to move axially relative to at least one said second body member to bring at least one said first engaging device and at least one said second engaging device into frictional engagement with each other.

9. An apparatus according to claim 1, further comprising at least one locking device for maintaining clamping engagement of a plurality of said clamping members with said cable.

10. An apparatus according to claim 1, wherein at least one said curved surface has a plurality of surface portions having different curvatures and adapted to engage respective surfaces of cables of different diameters.

11. An apparatus according to claim 1, wherein at least one said clamping member comprises at least one protrusion on a surface thereof adapted to be brought into clamping engagement with the cable.

12. An apparatus according to claim 11, wherein at least one said protrusion is adapted to penetrate at least one layer of the cable.

13. An apparatus according to claim 1, wherein the apparatus is adapted to make electrical contact with at least one electrically conductive member of the cable.

14. A cable gland comprising;
a gland body having a third aperture therethrough for receiving at least part of a cable;
at least one seal for sealing engagement with at least part of a cable extending through said third aperture; and
at least one clamping apparatus according to claim 1.

15. A cable gland according to claim 14, further comprising at least one first gland body member and at least one second gland body member, wherein at least one said clamping apparatus is actuated by rotation of at least one said first gland body member relative to at least one said second gland body member.

16. The clamping apparatus of claim 1, wherein said one or more protrusions engage said respective recesses formed in a body member of the body.

17. The clamping apparatus of claim 1, wherein the body includes a first body member and a second body member, and wherein the respective recesses are formed in the second body member.

18. The clamping apparatus of claim 1, wherein inward or outward pivoting of said clamping members is achieved by rotation of the first body member relative to the second body member.

19. The clamping apparatus of claim 1, wherein said one or more protrusions comprise a second protrusion on a second side of the clamping members, and further comprising:
a first protrusion at a first side of the clamping members.

20. The clamping apparatus of claim 19, wherein said first protrusion engages the first body member of the body such that rotation of the clamping members relative to the first body member causes the clamping members to pivot relative to said at least one actuator device to reduce the size of said first aperture.

* * * * *